United States Patent [19]
Garber

[11] Patent Number: 5,963,923
[45] Date of Patent: Oct. 5, 1999

[54] SYSTEM AND METHOD FOR TRADING HAVING A PRINCIPAL MARKET MAKER

[76] Inventor: Howard B. Garber, 2305 N. Commonwealth Ave., Chicago, Ill. 60614

[21] Appl. No.: 08/868,200

[22] Filed: Jun. 3, 1997

Related U.S. Application Data

[60] Provisional application No. 60/030,584, Nov. 12, 1996.

[51] Int. Cl.[6] .................................................. G06F 15/30
[52] U.S. Cl. ............................ 705/37; 705/35; 235/379; 235/380
[58] Field of Search ........................ 705/37, 35; 235/379, 235/380

[56] References Cited

U.S. PATENT DOCUMENTS

| | | | |
|---|---|---|---|
| 4,674,044 | 6/1987 | Kalmus et al. | 705/37 |
| 4,677,552 | 6/1987 | Sibley, Jr. | 705/37 |
| 4,903,201 | 2/1990 | Wagner | 705/37 |
| 4,926,368 | 5/1990 | Morita et al. | 705/35 X |
| 4,980,826 | 12/1990 | Wagner | 705/37 |
| 5,003,473 | 3/1991 | Richards | 705/37 |
| 5,077,665 | 12/1991 | Silverman et al. | 705/37 |
| 5,101,353 | 3/1992 | Lupien et al. | 705/37 |
| 5,168,446 | 12/1992 | Wiseman | 705/37 |
| 5,195,031 | 3/1993 | Ordish | 705/37 |
| 5,262,942 | 11/1993 | Earle | 705/37 |
| 5,297,031 | 3/1994 | Gutterman et al. | 705/37 |
| 5,297,032 | 3/1994 | Trojan et al. | 705/37 |
| 5,305,200 | 4/1994 | Hartheimer et al. | 705/37 |
| 5,453,601 | 9/1995 | Rosen | 705/43 X |
| 5,455,407 | 10/1995 | Rosen | 705/42 X |
| 5,694,552 | 12/1997 | Aharoni | 705/37 |

FOREIGN PATENT DOCUMENTS

| | | |
|---|---|---|
| 0 388 162 A2 | 9/1990 | European Pat. Off. . |
| 0 411 748 A2 | 2/1991 | European Pat. Off. . |
| 0 434 224 A2 | 6/1991 | European Pat. Off. . |
| 0 512 702 A2 | 11/1992 | European Pat. Off. . |
| WO 94/18640 | 8/1994 | WIPO . |
| WO 9605563A1 | 2/1996 | WIPO . |
| WO 96/21903 | 7/1996 | WIPO . |

OTHER PUBLICATIONS

Hakansson et al.; "On the Feasibility of Automated Market Making by a Programmed Specialist", The Journal of Finance, vol. XL, No. 1, Mar. 1985.

Howard Barbara; The Trade: Technology aims to take the Final Step. (Automation of Stck Exchanges), Institutional Investor, v25, No. 1, P. S15(2), Sep. 1984.

Freund, William C.; "Trading stock around the Clock: the Future Growth of Global Electronic Markets", California Management Review, v34, N1, p. 87 (16), Fall 1991.

Primary Examiner—Allen R. MacDonald
Assistant Examiner—Jagdish Patel
Attorney, Agent, or Firm—Brinks Hofer Gilson & Lione

[57] ABSTRACT

A system and method is provided for linking a Rolling Spot Currency contract with a Principle Market Maker program. In one aspect of the invention, the system includes an electronic brokerage and trading network having at least one computer coupled to receive and transmit bids and offers for international currency trading; a display terminal and input; and a principal market maker computer coupled to the electronic brokerage and trading network wherein the principal market maker computer is operative to receive and transmit the bids and offers and execute international currency trades by maintaining a market for such currencies. In another aspect of the invention, the method includes the steps of receiving and transmitting bids and offers for publicly traded currencies; storing the received bids and offers in a memory; identifying and executing the matching bids and offers; and identifying unmatched bids and offers and providing a complementary trade to maintain a market for such currencies.

28 Claims, 9 Drawing Sheets

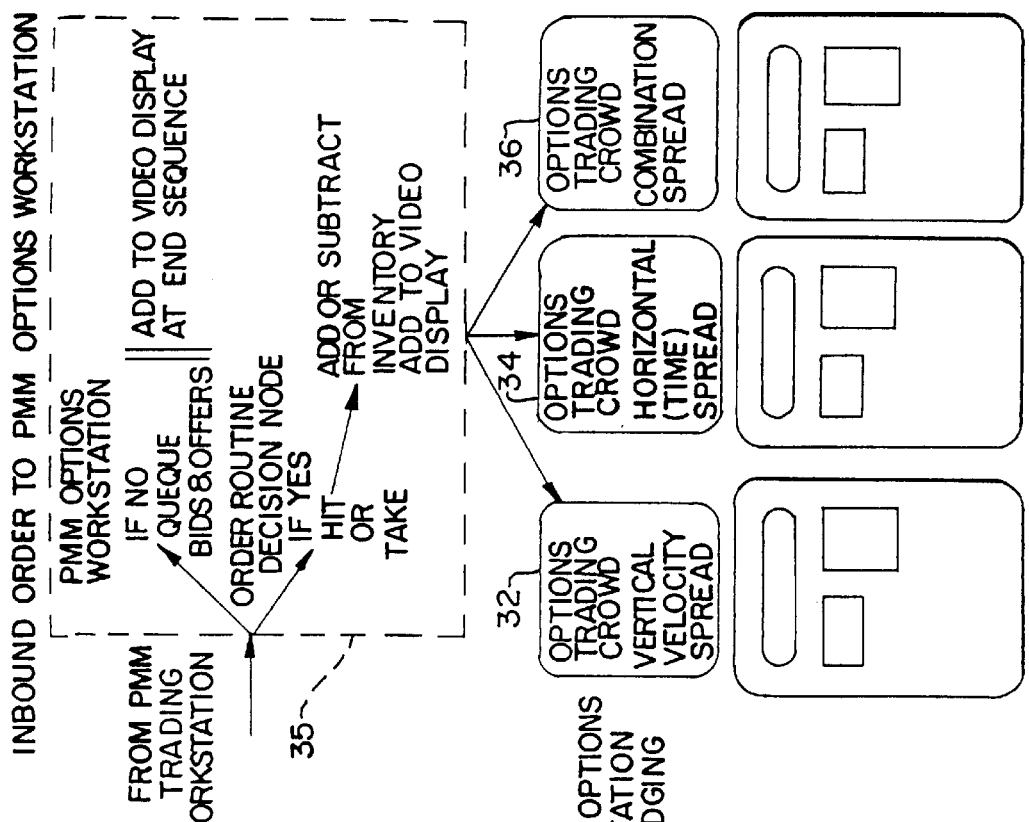
FIG. 5 INBOUND ORDER TO PMM OPTIONS WORKSTATION
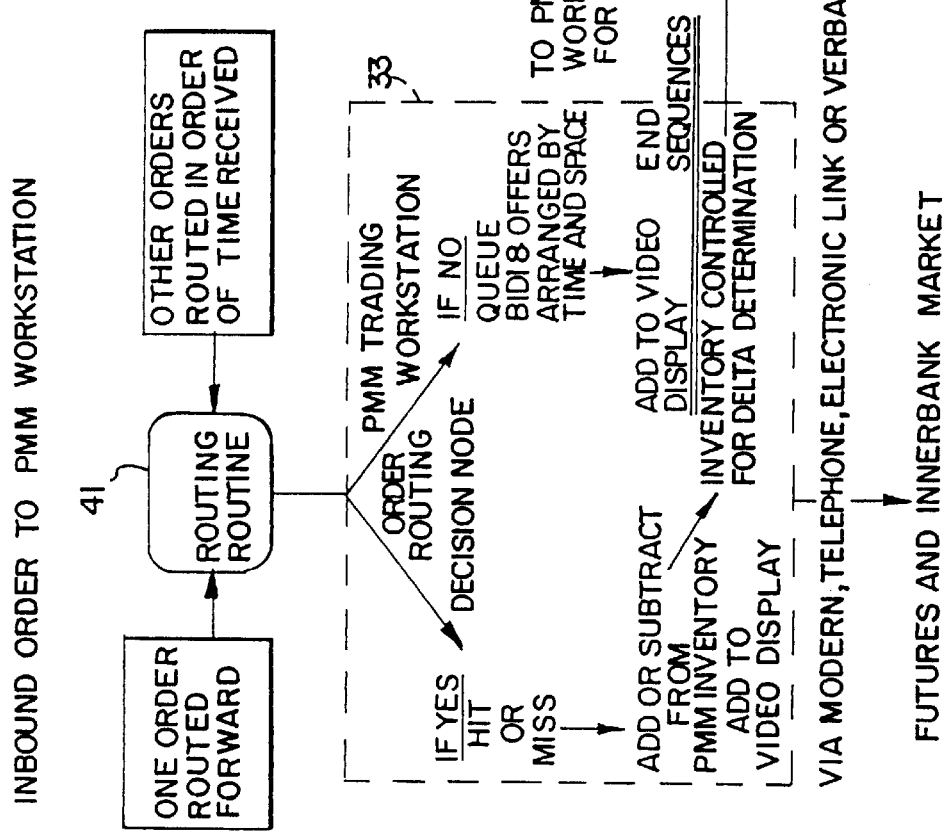
FIG. 4 INBOUND ORDER TO PMM WORKSTATION

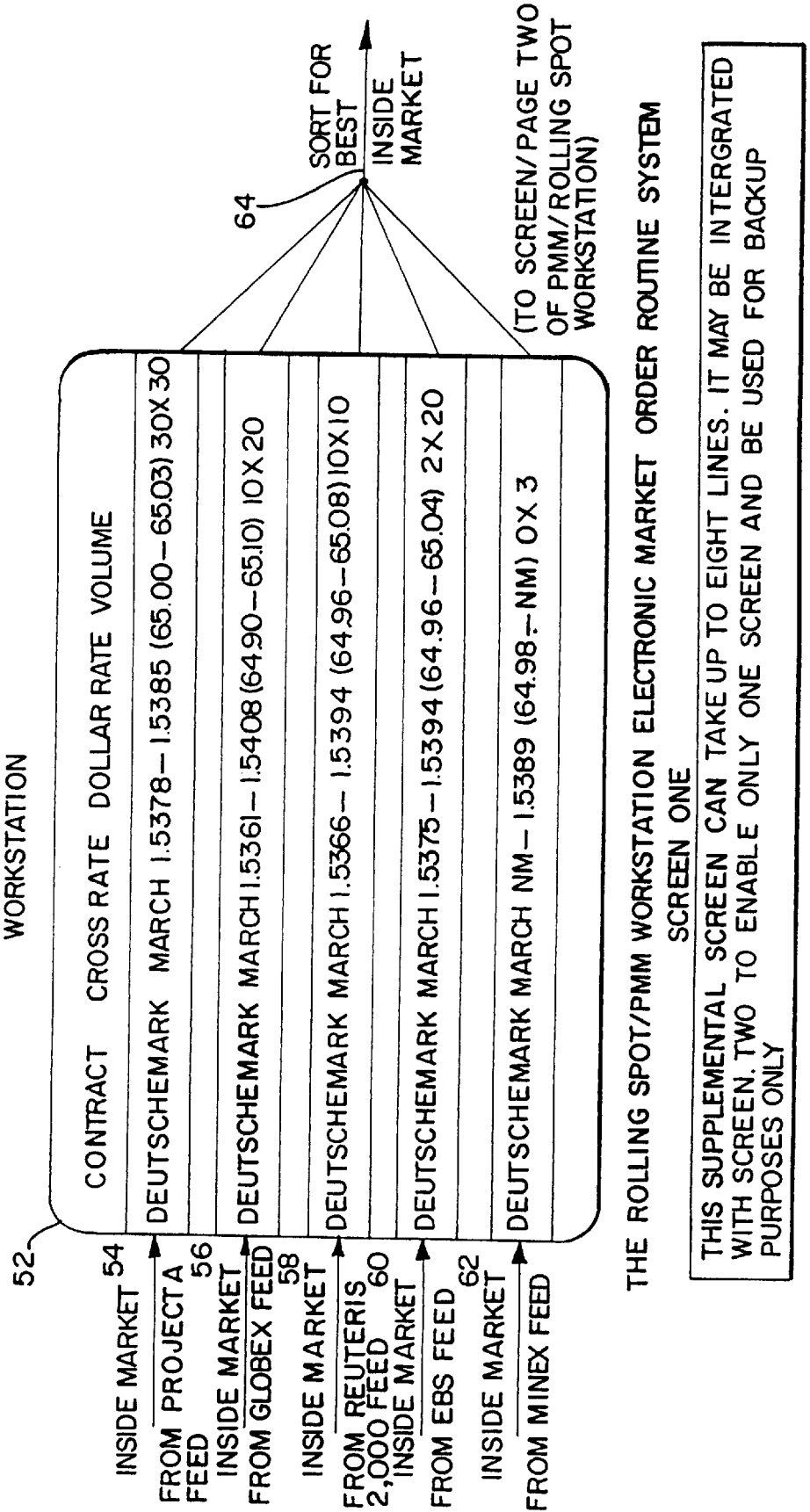

5,963,923

SYSTEM AND METHOD FOR TRADING HAVING A PRINCIPAL MARKET MAKER

This application claims the benefit of U.S. Provisional Application No. 60/030,584, filed Nov. 12, 1996.

FIELD OF THE INVENTION

The invention relates to an electronic trade exchange system and in particular to the merger of a specialist system charged with the responsibility of making a sized (designated large quantity), two-sided bid/offer market in a traditional pit trading environment.

BACKGROUND OF THE INVENTION

There are many different types of exchanges in existence, such as the New York Stock Exchange (NYSE) and the Chicago Board of Trade (CBOT). Generally these exchanges provide an open market for the purchase and sale of securities and commodities. Principle or designated market makers can be employed at these exchanges to maintain a market in securities and commodities. The market maker maintains a market by being on the opposite side of every trade.

The use of a human market maker in a trading environment is known. For example, the use of a market maker has been employed in connection with trading securities. Rules pertaining to the use of a Principal Market Maker (PMM) in futures markets have also been proposed by the Chicago Mercantile Exchange (CME) to allow the use of a market maker in a commodities environment. However, these rules have not been implemented. The CME's proposed rules for its Principal Market Maker (PMM) are similar to rules written by the Chicago Board of Options Exchange (CBOE), although adapted for exchange traded futures.

The PMM's functions are similar to that of a market making foreign exchange bank and broker specialist. A PMM specialist should continuously maintain a sized two-sided bid/offer market for its designated products. This market should be of a designated minimum quantity and maximum spread, i.e., the difference between bid and offer. Also, the PMM should maintain the "public order book" (collection of public customer orders to purchase or sell) with respect to the assigned products. Finally, the PMM should give priority to customer order execution over personal trading.

As compensation for the above functions, the PMM is typically entitled to participatory volume defined as the average daily pit traded volume for the preceding calendar quarter. For example, the PMM may be entitled to 40% of volume at the bid/offer price if volume is between zero and 2,500; and 35% of volume at the bid/offer price if volume is between 2,501 and 5,000. No entitlements are currently offered if volume exceeds 5,000 transactions per day. Additionally, the PMM is entitled to the retention of floor executed brokerage transactions commissions except where principal-agency conflicts of interest apply, or other arrangements have been made.

The foreign exchange spot cash market facilitates the exchange of currency between two parties. The actual currency transfer generally occurs two business days following the transaction date. At the close of business of each trading day, market participants roll or swap their open spot positions forward one business day. This enables the next trading day's position to be maintained in spot terms. Eventually, future spot positions are netted against existing positions.

The CME's Rolling Spot Currency contract parallels the quoted spot or cash market with a few notable exceptions: (1) the exchange makes an automatic daily adjustment for the "roll" via a cash debit/credit; (2) because the trades go through the CME Clearing House, many problems associated with interbank spot transactions are eliminated; and (3) all Rolling Spot Currency contracts currently have a standard size. Thus, the CME's Rolling Spot Currency contracts combine the price convention of the interbank market with all the benefits of the CME and its existing central clearing facility. Traders do not have to pay away bid/ask spreads on daily spot rolls because the CME's roll process, called the "Daily Adjustment," is performed automatically. The need for a credit-worthiness counterparty check is eliminated because the counter-party is always the CME Clearing House. Overdraft expenses are eliminated using Rolling Spot Currency contracts because there is no need to actually make a payment or accept a delivery as in the foreign exchange (forex) markets.

Unlike regular spot transactions in the foreign exchange markets, Rolling Spot Currency trades do not tie up bank credit lines. Therefore, institutional traders can conserve their firm's credit lines for other uses. Because Rolling Spot Currencies are a centralized exchange traded contract, these contracts allow all traders to obtain the same quotes regardless of their firm's credit rating or size. Quick access to cash flows can also be created by combining the CME's Rolling Spot Currencies with currency forwards to produce forward swap positions. In addition to freeing up credit lines, Rolling Spot Currency positions are not affected by the Bank for International Settlements' Capital Adequacy Requirement Standards.

By circumventing the tasks of funds transfer and multiple ticket writing to facilitate the roll, the CME replicates the one-day roll with a simple line entry and no deliveries. Furthermore, multiple trades transacted in the interbank market with several counterparties require separate ticketing for each buy and sell. The CME's Average Price System (APS) allows multiple Rolling Spot trades transacted throughout the day to be assigned an average price. The APS significantly reduces costly paperwork because the trader has the benefit of averaging all trades into single buy and sell tickets.

Previous attempts at providing an active interbank exchange traded currency market have failed. One reason that previous attempts have failed is because futures markets do not presently require nor provide the proper incentives to any trader or entity to deliver the service of a current 24-hour bid/offer and large quantity market. Failure of prior attempts to develop an interbank exchange traded currency has kept the transaction cost (the difference between bid and offer) of market participation in worldwide international currency trade very high because liquidity of the exchange traded futures market is relatively low vis-a-vis the interbank over-the-counter forex market.

Futures exchange traded foreign currency trading has failed to compete with the over-the-counter-forex market. The CME's foreign currency volume has recently declined, while over-the-counter volume increased. In addition, a "second tier" of currency trading banks have recently entered the "top twenty" group of currency traders. This suggests that market growth in foreign currency trading is dynamic, not static, and represents another failure of the current methodology of exchange traded foreign currencies.

Prior attempts have also been made by exchanges to capture market share in the area of currency trading which is established between the spot (current date transaction) and the short duration (1–14 days) of currency market derivative products. Foreign exchange average daily volume may be as high as 893 billion dollars. Two thirds of this figure may also represent forward and swap derivative transactions. These transactions represent an important untapped market for exchange traded currency products.

Another area in which exchange traded currencies have failed to compete is the area called Exchange For Physical (EFP). This area is currently a fast growing, off-exchange trade between Futures Clearing Merchants (FCM), which are analogous to brokerage houses in the securities industry. Because of the failure to provide a market maker with long term growth incentives to position itself in the market 24-hours per day, and to market and make the essential business contacts to promote its service and the exchange's products, exchange traded currencies are losing business to the EFPs. Furthermore, the EFP is another area of over-the-counter, unregulated currency trading which is developing to the detriment of world financial stability.

The greatest failure of the over-the-counter forex currency market is its inability to transfer risk in a timely, cost effective manner. The possibility of failure of one or more large currency market making banks is great because no present arena provides the vital service of efficient, cost effective risk transfer.

Prior attempts at capturing flexibility in establishing new innovative currency contracts and direct marketing contacts with currency trading personnel have failed on the major futures exchanges. This failure to innovate and communicate is also exposing the world to potential currency risk because exchanges cannot provide the necessary products to limit risk. By establishing a mechanism associated with an exchange responsible for making a market at all times and charged with the responsibility of marketing that presence, the futures exchanges will be able to provide a much needed service similar to a bank, but with all the inherent advantages of cost competitiveness and regulatory safety of an exchange.

SUMMARY OF THE INVENTION

The present invention provides a method and system for linking Rolling Spot Currency contracts with a PMM specialist program. The Rolling Spot Currency contracts are futures contracts which in almost all aspects replicate spot currencies in the forex market. The PMM specialist program is designed to replicate an over-the-counter bank trading environment by merging the best aspects of a specialist system—a combined trader and broker, charged with the responsibility of making a sized two-sided, bid/offer market—with a traditional futures pit trading environment.

In a first aspect of the present invention, the system includes an electronic brokerage and trading network having at least one computer coupled to receive and transmit bids and offers for international currency trading; a display terminal and input; and a PMM computer coupled to the electronic brokerage and trading network wherein the PMM computer is operative to receive and transmit the bids and offers and execute international currency trades by maintaining a bid and offer market for such currencies.

In a second aspect of the present invention, the system includes means for receiving a primary currency purchase order indicative of whether a currency is to be bought or sold; means for receiving a secondary currency purchase order indicative of a currency option hedge; a PMM futures computer coupled to the means for receiving the primary currency purchase order and operative to execute primary currency purchase orders and maintain a currency futures market; a PMM options computer coupled to the means for receiving the secondary currency purchase order and operative to execute secondary currency purchase orders and maintain a currency options bid and offer market; and a bidirectional communications link coupled between the futures and options computers to facilitate intermarket trading to manage risk taken in a position resulting from a trade in either market.

In a third aspect of the present invention, the system includes a communications interface operative to transmit currency bids and offers from at least one financial institution; and a PMM computer coupled to the communications interface and operative to receive the currency bids and offers and execute trades to maintain a market for international currency trades.

In a fourth aspect of the present invention, the system includes an electronic brokerage and trading network having at least one computer, display terminal and input coupled to receive and transmit bids and offers; and a principal market maker computer coupled to the electronic brokerage and trading network to receive and transmit the bids and offers and execute trades by maintaining a constant bid and offer market.

A fifth aspect of the present invention involves a method of trading currencies including the steps of receiving and transiting bids and offers for publicly traded currencies; storing the received bids and offers in a memory; identifying matching bids and offers; executing the matching bids and offers; identifying unmatched bids and offers; and providing a complementary trade to maintain a market for such currencies.

A sixth aspect of the present invention involves a method of maintaining a market for publicly traded currencies including the steps of receiving a primary currency purchase order, the primary currency purchase order indicative of whether a currency is to be bought or sold; receiving a secondary currency purchase order, the secondary currency purchase order indicative of a currency option hedge; matching and executing the primary currency purchase order to maintain a currency futures market; matching and executing the secondary currency purchase order to maintain a currency options market; and providing intermarket futures and options trading to manage risk taken in a position resulting from a trade in either market.

A seventh aspect of the present invention involves a method of trading currencies including the steps of receiving currency bids and offers from at least one financial institution; storing the currency bids and offers in a memory; matching the stored bids and offers to maintain a market for the currency traded; and executing the matched trades.

An eighth aspect of the present invention involves a method of trading including the steps of receiving and transmitting bids and offers; storing the received bids and offers in a memory; identifying matching bids and offers; executing the matching bids and offers; identifying unmatched bids and offers; and providing a complementary trade to maintain a market.

Some of the benefits to be expected from the merger of the PMM specialist and Rolling Spot Currency contracts include, but are not limited to: (1) increased volume and open interest in both currency futures and currency options and, therefore, a reduction in currency transaction costs; (2) greater ability to utilize modern risk transfer techniques to reduce risk and increase person-o-person servicing and marketing in the foreign exchange market; (3) a more stable financial environment because of exchange dictated clearing considerations and regulations; and (4) the convenience of a 24-hour electronic futures market place for all currency traders and financial institutions worldwide.

The invention itself, together with further objects and attendant advantages, will be understood by reference to the following detailed description, taken in conjunction with the accompanying drawings.

BRIEF DESCRIPTION OF THE DRAWINGS

FIG. 4 is a flow chart of the processing that occurs inside the PMM/Rolling Spot Future computer.

FIG. 5 is a flow chart of the processing that occurs inside the PMM/Rolling Spot Option computer.

FIG. 6 is a graphical representation of the PMM/Rolling Spot Link electronic market order routing system of the present invention.

DETAILED DESCRIPTION OF THE PRESENTLY PREFERRED EMBODIMENTS

Figure 1:
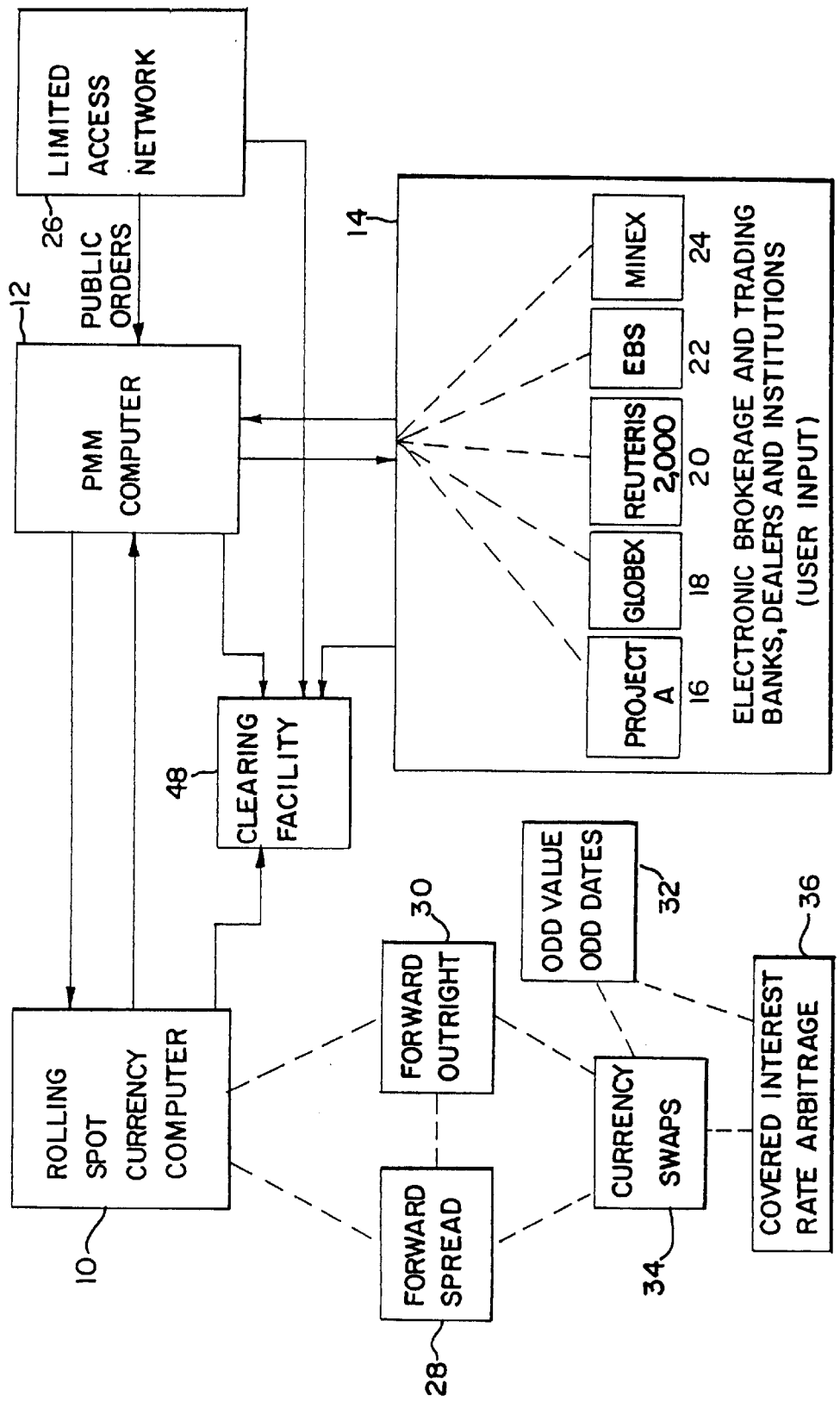
FIG. 1 is a block diagram of one presently preferred embodiment of the PMM /Rolling Spot Currency system of the present invention.

FIG. 1 is a block diagram of one presently preferred embodiment of the PMM/Rolling Spot Currency system of the present invention. Preferably, the system includes PMM computer 12; a computer 10 coupled to the PMM computer 12 for trading rolling spot currency; an electronic brokerage and trading network 14 including a plurality of electronic trading systems 16, 18, 20, 22, 24 for use primarily by professional traders such as banks, dealers and institutions; a limited access network 26 primarily for use by non-professional traders such as individuals; and a clearing facility 48 coupled to the PMM computer 12, the computer 10, the electronic brokerage and trading network 14 and the limited access network 26 to confirm and settle trades executed by the PMM computer 12. The PMM computer 12 handles the purchase and sale of currencies and is constantly charged with maintaining a currency market, i.e., sized bid/offer market. Preferably, as those skilled in the art would appreciate, computers 10 and 12 should be able to accommodate a large amount of transactions in a timely manner.

The electronic trading systems Project A 16, Globex 18, Reuters 2000 20, Electronic Brokerage System ("EBS") 22, Minex 24 are well known in the art and need not be discussed in further detail herein. These systems are coupled to the PMM computer 12 to receive and transmit bids and offers for international currency trading. The PMM/Rolling Spot Currency system of the present invention facilitates numerous types of derivative currency trades. Preferably, these trades include forward spread 28, forward outright 30, currency swap 34, odd value and odd date 32, and covered interest rate arbitrage 36.

The ability to transfer risk automatically and instantaneously through electronic and/or verbal communications from the PMM computer 12 to various other individual traders, or other entities, is a unique PMM/Rolling Spot Currency system feature. Unlike banks, whose only method of transferring risk is to make markets which, in many instances, contain sufficiently wide spreads (the difference between the bid and the offer) in order to minimize bank risk at customer expense, the PMM/Rolling Spot currency system allows for risk minimization at the same time that it reduces the size of the spread between bid and offer.

Figure 2:
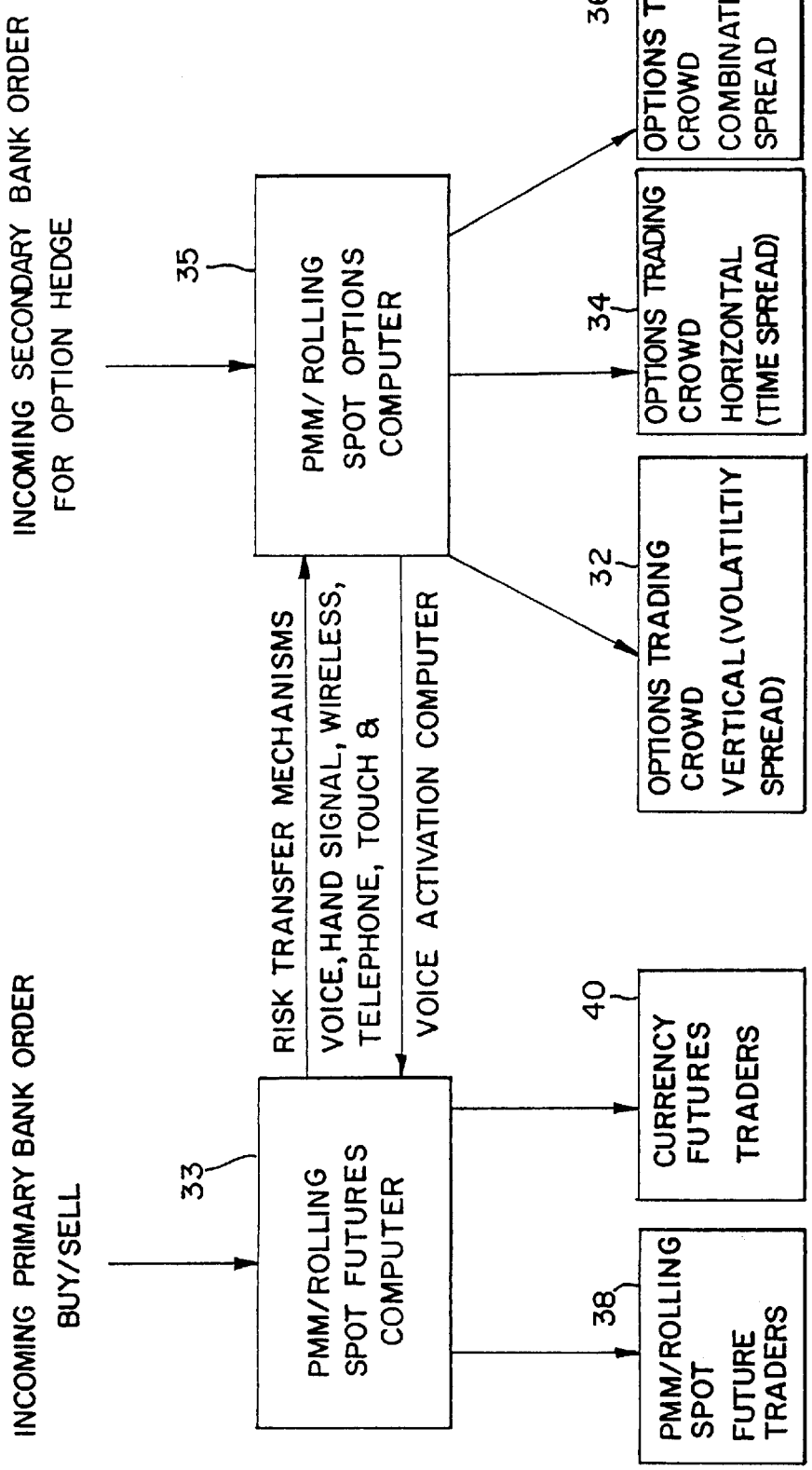
FIG. 2 is a block diagram of a more detailed illustration of the PMM/Rolling Spot Currency link of the system shown in FIG. 1.

FIG. 2 is a block diagram of a more detailed illustration of the PMM/Rolling Spot Currency system shown in FIG. 1. In particular, FIG. 2 illustrates the manner in which a PMM/Rolling Spot Futures computer 33 can transfer risk associated with trades to a PMM/Rolling Spot Options computer 35. This process is called primary risk transfer. Primary risk transfer can be accomplished through the use of communications, preferably electronic communications, between a PMM/Rolling Spot Futures computer 33 and a PMM/Rolling Spot Options computer 35. Such communications preferably include wireless, telephone, touch and voice activation computer. Primary risk transfer involves inventory hedge (defense) through the use of call option (the right to buy the underlying purchase or sale) and put option (the right to buy the underlying purchase or sale). The purchase of a call option allows upside potential investment increase when a market rises, while the sale of a call option allows limited downside investment increase when the market decreases. On the other hand, the purchase of a put option allows potential upside investment increase when a market declines, while the sale of a put option allows limited upside investment increase when a market rises.

Referring to FIG. 2, an example of the process just described is illustrated as follows. The PMM/Rolling Spot Futures computer 33 receives a primary bank order to purchase or sell currency. The PMM/Rolling Spot Futures computer 33 promptly counters the risk associated with the futures purchase or sale by the purchase of a reciprocal amount of options from the PMM/Rolling Spot Options computer 35, thereby producing a synthetic short sale. This action neutralizes the PMM's inventory risk. Therefore, the original inventory action has been canceled. The PMM/Rolling Spot Options computer 35 transfers risk by making the appropriate transactions within the options trading crowd through terminals 32, 34, 36. These transactions disperse the risk among a multitude of traders. As shown in FIG. 2, the risk can be dispersed horizontally through time spreads, vertically through volatility spreads or a combination of horizontal and vertical spreads, known as "combos" or "straddles".

Secondary risk transfer is distinguished from primary risk transfer in that a bank or other institution does not wish to purchase the underlying currency prior to entering into an options transaction. This secondary process is accomplished as follows. The PMM/Rolling Spot Options computer 35 receives a secondary bank order for an option hedge. The PMM/Rolling Spot Options computer 35 promptly transfers this risk by the purchase or sale of the appropriate amount of futures. The PMM/Rolling Spot Futures computer 33 transfers risk by making the appropriate transactions within the PMM/Rolling Spot Futures Traders 38 and the Currency Futures Traders 40.

A typical example of a primary risk transfer transaction is illustrated as follows. First, the PMM/Rolling Spot Futures computer 33 receives an inventory order of 100 Rolling Spot Currency futures at a hypothetical Deutschmark price of $0.6500 (DM 1.5385), basis December, which it must purchase. The PMM/Rolling Spot Futures computer 33 promptly transfers this risk by the purchase of the same amount of December $0.6500 (DM1.5385), put options (the right to sell) and the sale of the same amount of December $0.6500 (DM 1.5385), call options (the right to buy) producing a synthetic short sale. This action neutralizes the PMM's inventory risk. Therefore, the original inventory action has been canceled. The PMM/Rolling Spot Options computer 35 transfers risk by making the appropriate transactions within the options trading pit crowd, thereby laying off that risk and dispersing the risk among the multitude.

A typical secondary risk transfer is illustrated as follows. Assume that a bank has previous ownership of 100 Rolling Spot Currency futures and now needs to hedge its own inventory. The bank may purchase the same amount of December $0.6500 (DM 1.5385), put options and sell the same amount of December $0.6500 (DM 1.5385), call options, again producing a synthetic short sale. The bank has now transferred or neutralized its risk. The PMM/Rolling Spot Options computer 35 will be able to transfer the risk which it just assumed in the following manner. The first transfer mode would be the inverse of the primary risk transfer. For instance, if the PMM/Rolling Spot Options computer 35 inventories 100 December $0.6500 (DM 1.5385), calls, it may sell 100 December $0.6500 (DM 1.5385), put options and the corresponding amount of Rolling Spot Currency futures from the PMM/Rolling Spot Futures computer 33. This will neutralize the PMM/Rolling Spot Options computer 33 risk.

A second mode of risk transfer for the PMM/Rolling Spot Options computer 35 is transfer of risk into the options pit trading crowd. At this point, the risk can be dispersed horizontally through time spreads, vertically through volatility spreads or a combination of horizontal and vertical spreads. The ultimate product of its risk transfer product is always the same—enabling the PMM computers 33, 35 to make 24-hour markets in a risk minimum exchange traded environment—something never before accomplished.

Unique to creating an exchange traded forex market by linking the PMM computer 12 (FIG. 1) and Rolling Spot Currencies, is the ability to offer a reliable electronic 24-hour exchange(s) traded market with current bid/offer, offer quotes and size. With this exchange traded market maker function, a 24-hour exchange electronic traded banking market—a forex bank and institutional trading market—is now possible. This electronic traded banking market can be accomplished by forming an exchange of non-equity owning banks and other qualified financial institutions which would have electronic linkage to the exchange traded forex markets of the rolling spot and other derivative currencies. These non-equity members preferably would have the ability to execute their transactions at member exchange rates, electronically as any other member of the exchange(s) would have. The major difference between the electronic market and full exchange privilege would be that electronic market participants would only have the electronic ability to access the exchange trading PMM computer directly and not have physical access to the exchange trading floor. This does not present an obstacle because most banks do not want the cost or responsibility of accessing the exchange floor directly. They simply would like the opportunity to trade competitively and at a very low cost.

Figure 3:
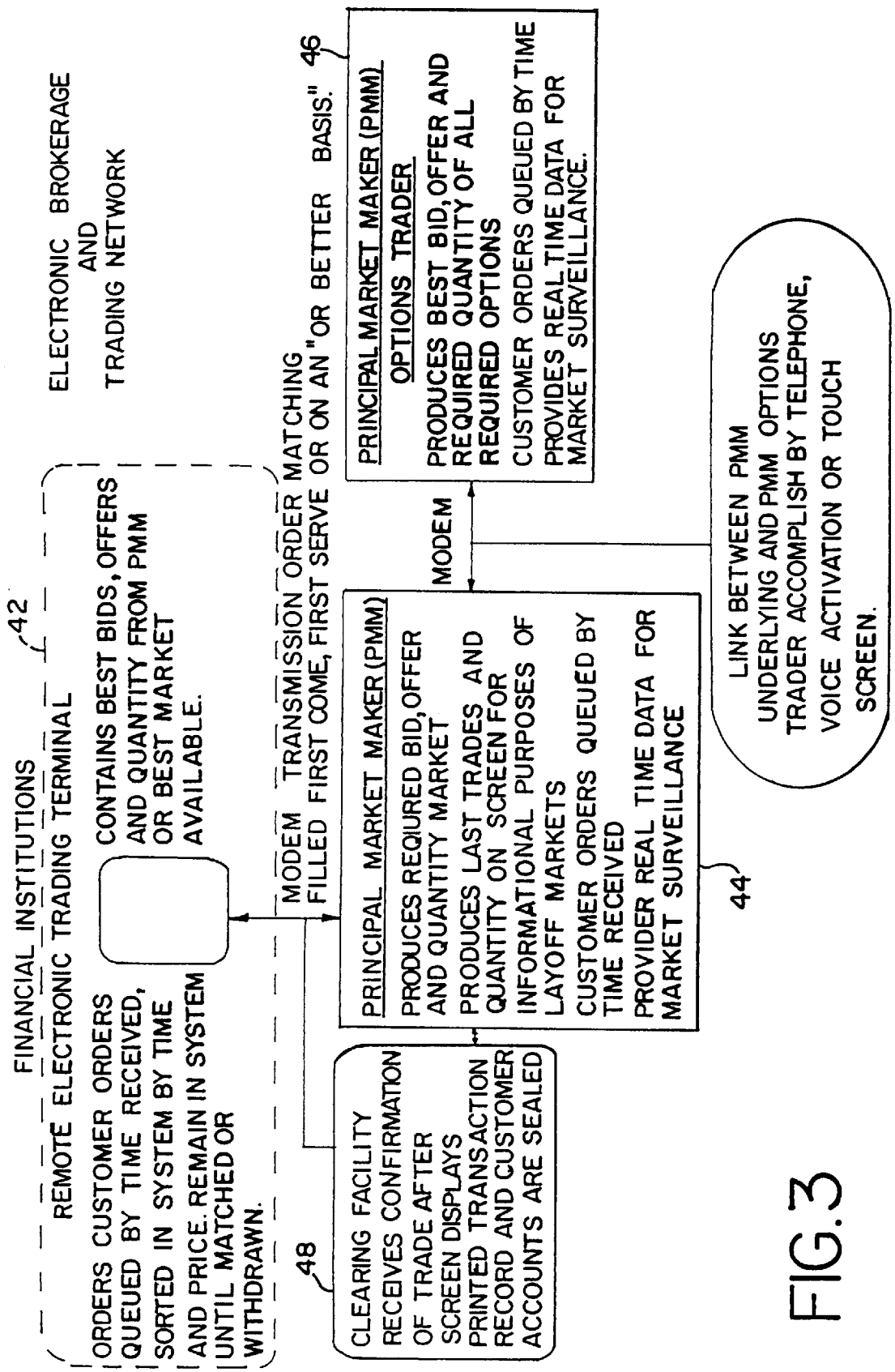
FIG. 3 is a block diagram of the PMM/Rolling Spot Currency Link of the present invention which illustrates trading using the electronic brokerage and trading network shown FIG. 1.

FIG. 3 is a block diagram of the PMM /Rolling Spot Currency system of the present invention which illustrates trading using the electronic brokerage and trading network 14 shown in FIG. 1. The electronic brokerage and trading network 14 allows remote terminal trading between financial institutions. Preferably, a remote terminal 42 located at a financial institution receives customer orders and queues them by time received and price. These requests remain in the system until matched or withdrawn. The remote terminal 42 accesses PMM computer 44, preferably via modem, to obtain required bid, offer and quantity markets information. The PMM computer 44 displays last trades and quantity on its screen for information purposes of computing risk transfer information. The financial institution, via remote terminal 42, can match the bid or offer based on stored customer requests. If a trade is completed to the PMM computer's 44 inventory, the PMM computer 44 will automatically transfer the risk assumed in the trade by transmitting to the PMM Options computer 46 a request to purchase the same amount of put options or sell the same amount of call options, thereby producing a synthetic short sale as described above. A clearing firm 48 receives confirmation of the trade after its screen (not shown) displays printed transaction record and customer accounts are settled. Finally, a clearing system 50 matches and settles the trades.

FIGS. 4 and 5 are flow charts of the processing that occurs inside the PMM/Rolling Spot Futures computer 33 and PMM/Rolling Spot Options computer 35, respectively. In FIG. 4, a host routing routine 41 sends orders to the PMM futures computer 33 in order of time of receipt. The PMM futures computer 33 then decides whether a trade will be executed. If a trade will not be executed, the PMM futures computer 33 queues the bid or offer in order of time of receipt and price and updates the video display to reflect the bid or offer. If a trade will be executed, depending on whether the order is a bid or an offer, the PMM futures computer 33 adds or subtracts the corresponding currency from; its inventory, updates the video display accordingly and transmits to the PMM/Rolling Spot Options computer 35 to transfer the risk associated with the trade.

In FIG. 5, the PMM/Rolling Spot Options computer 35 receives a transmission from the PMM/Rolling Spot Futures computer 33. The PMM Options computer 35 decides whether a trade will be executed. If a trade will not be executed, the PMM computer 35 queues the bid or offer in order of time of receipt and price and updates the video display to reflect the bid or offer. If a trade will be executed, depending on whether the order is a bid or an offer, the PMM Options computer 35 adds or subtracts currencies from the PMM inventory and updates the video display (not shown) accordingly. The PMM/Rolling Spot Options computer 35 transfers the risk associated with the trade by making the appropriate transactions within the options trading crowd through terminals 32, 34, 36.

Figure 7:
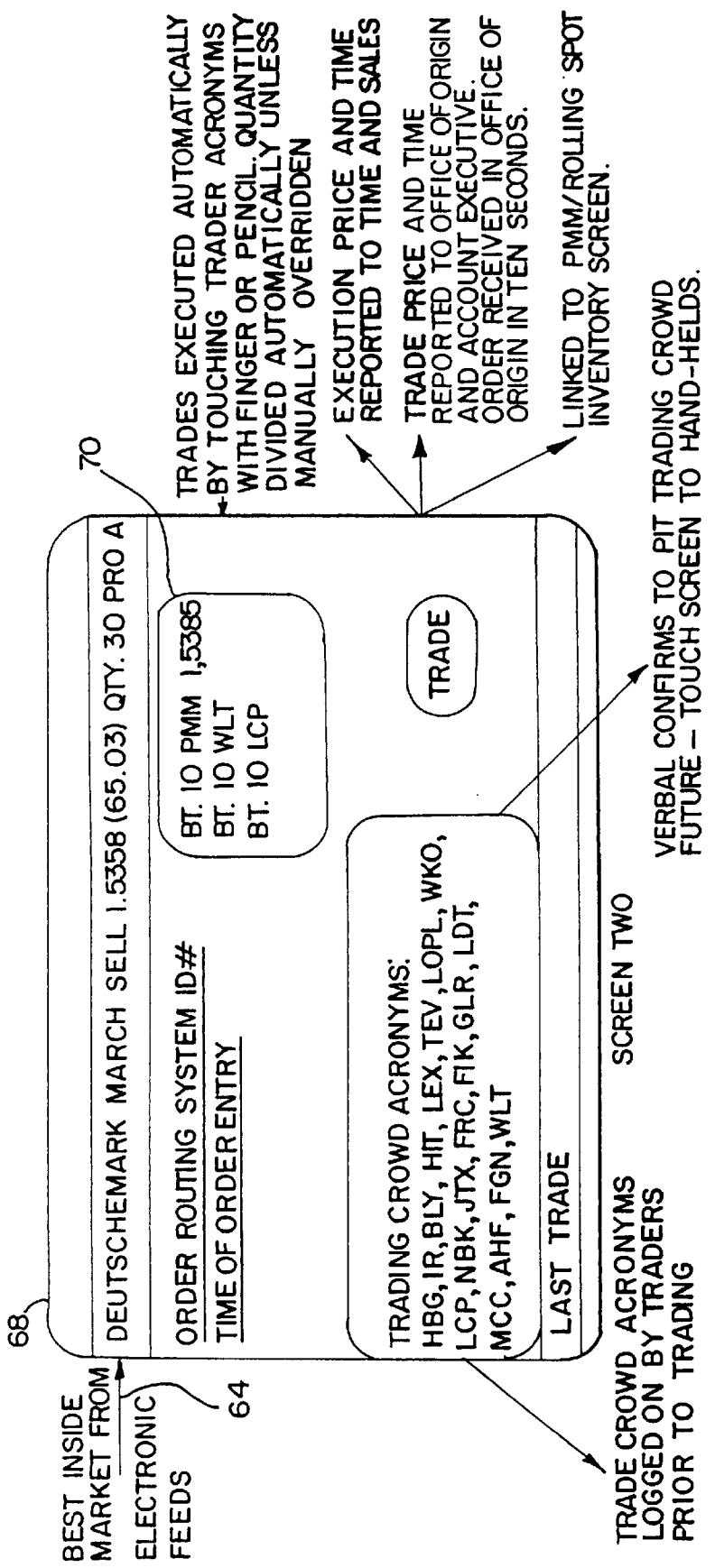
FIG. 7 is a presently preferred embodiment of an Automated Brokerage Screen for use with the PMM/Rolling Spot Link Futures Workstation of the system of the present invention.
Figure 8:
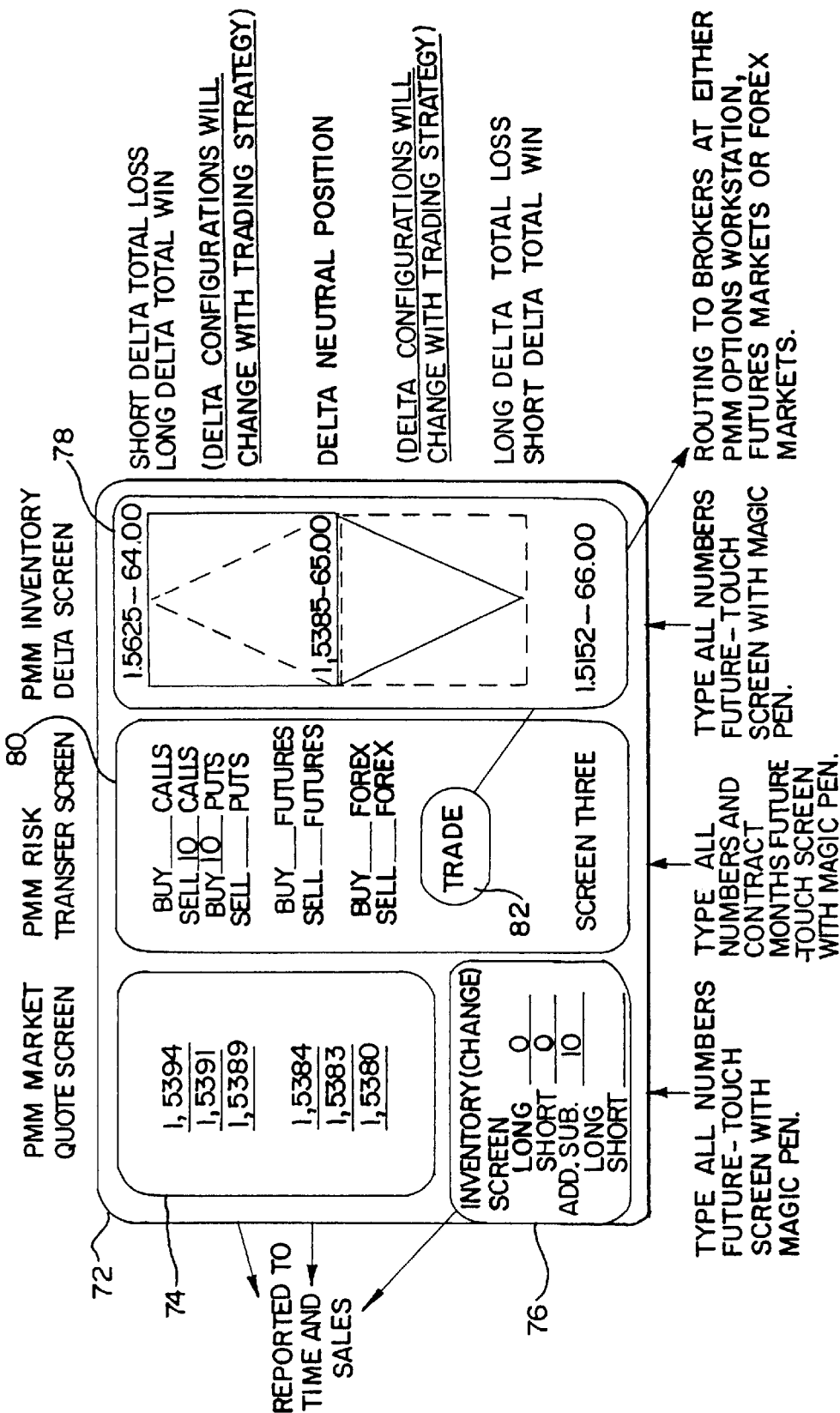
FIG. 8 is a presently preferred embodiment of a Trading and Risk Management Screen for use with the PMM/Rolling Spot Link Futures Workstation of the system of the present invention.

FIGS. 6–8 provide implementation views of the PMM/ Rolling Spot Link Workstation functions of the present invention. FIG. 6 shows a preferred embodiment of the PMM/Rolling Spot Link electronic market order routing system. In FIG. 6, the best inside markets 54, 56, 58, 60, 62 (highest bid and lowest offer) from the various electronic trading systems 16, 18, 20, 22 and 24 of FIG. 1 are communicated into the display field of screen 52. This information is stored by the PMM/Rolling Spot Link Workstation 33, 35 to produce the best overall inside market 64. This information is also transferred to the PMM/Rolling Spot Link Automated Brokerage Screen 68 as shown in FIG. 7.

In the current example, only one customer order is featured because all other customer orders are away from the market (above and below the market). The featured market is a sale of 35 March Deutschmark Rolling Spot at a price of DM 1.5385, ($0.6500). The screen 68 shown in FIG. 7 features a touch activated order fill device 70 which automatically divides the quantity of the trade among participating traders.

FIG. 8 shows a preferred embodiment of the PMM/Rolling Spot Link Workstation Trading and Risk Management Screen 72. In the current example, the PMM computer 12 (FIG. 1) has assumed the responsibility to make liquid markets by increasing the bid. The original bid was DM 1.5384, ($0.6500) as displayed in the PMM Market Quote Screen 74. However, the PMM computer 12 took the customer order one pip (one unit of currency movement) higher to facilitate the trade. Because there was also local participation at the same price, the PMM computer 12 received its mandated allowance for this trade of between 30% and 40% in accordance with the CME's proposed rules as previously described herein.

The Inventory (Change) Screen 76 and Inventory Delta Screen 78 allow the inventory position and risk to be known at all times. The Inventory (Change) screen 76 can be altered preferably by the use of a pointing device (not shown) and keyboard (not shown). The Inventory Delta Screen 78 has a color graphic feature which enables the PMM computer 12 to quickly understand the inventory risk position.

The PMM Risk Transfer Screen 80 is connected to the most commonly used floor brokers in the "options crowd" for PMM risk transfer at rapid rates. In the current example, the PMM computer 12 wishes to execute a "Conversion" (perfect hedge) to eliminate market risk and take advantage of time premium decay. (The amount an option would command if it were exercised immediately is termed its intrinsic value. However, options always trade above intrinsic value until the time of exercise at which time the option will trade at only its intrinsic value. The difference between the value of the option above intrinsic value and that value at exercise is known as time decay.) The trade is initiated preferably using a pointing device (not shown) and keyboard (not shown). This sets the amount of the specific product to purchase or sell. The trade button 82 is activated and the trade request is set to the PMM/Rolling Spot Options Workstation 33, 35 for execution. This action minimizes the PMM computer's 12 risk, heretofore, unavailable to any interbank trader.

Figure 9:
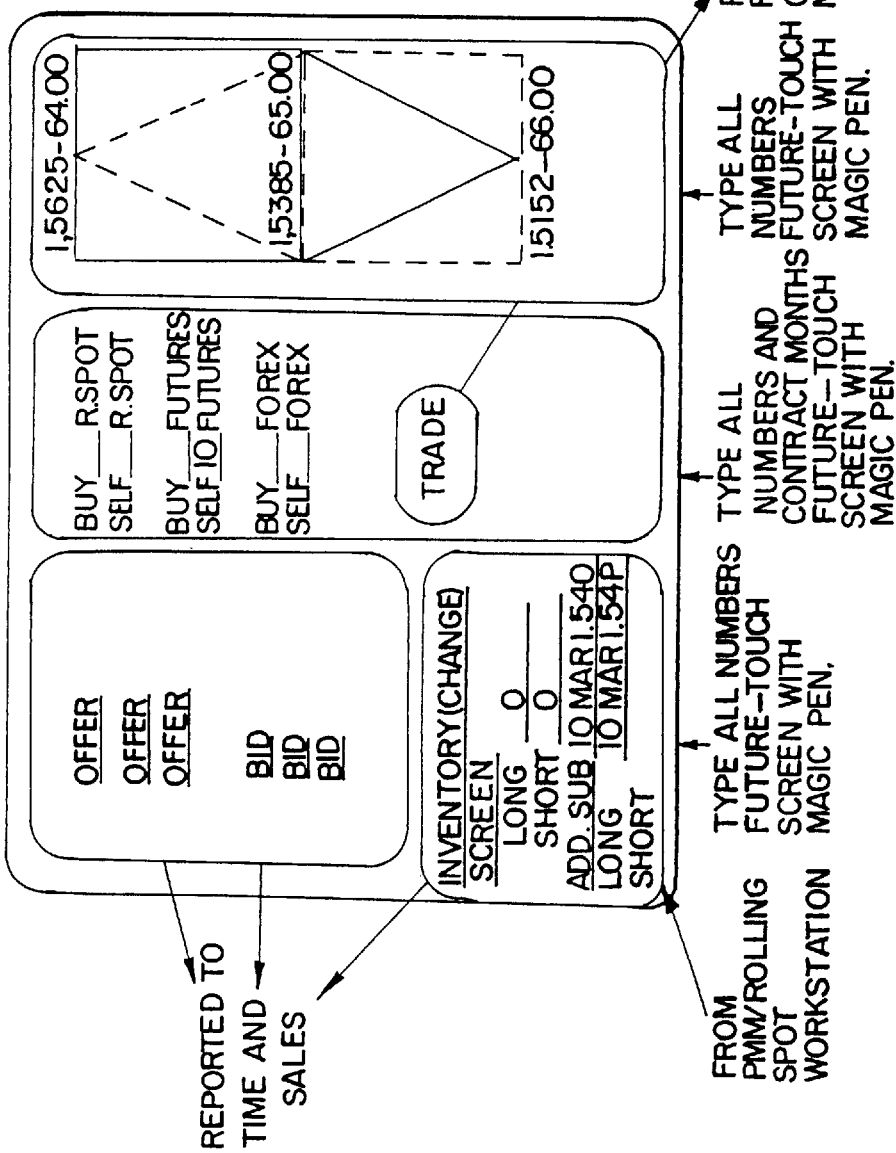
FIG. 9 is a presently preferred embodiment of a Trading and Risk Management Screen for use with the PMM/Rolling Spot Link Options Workstation of the system of the present invention.
Figure 10:
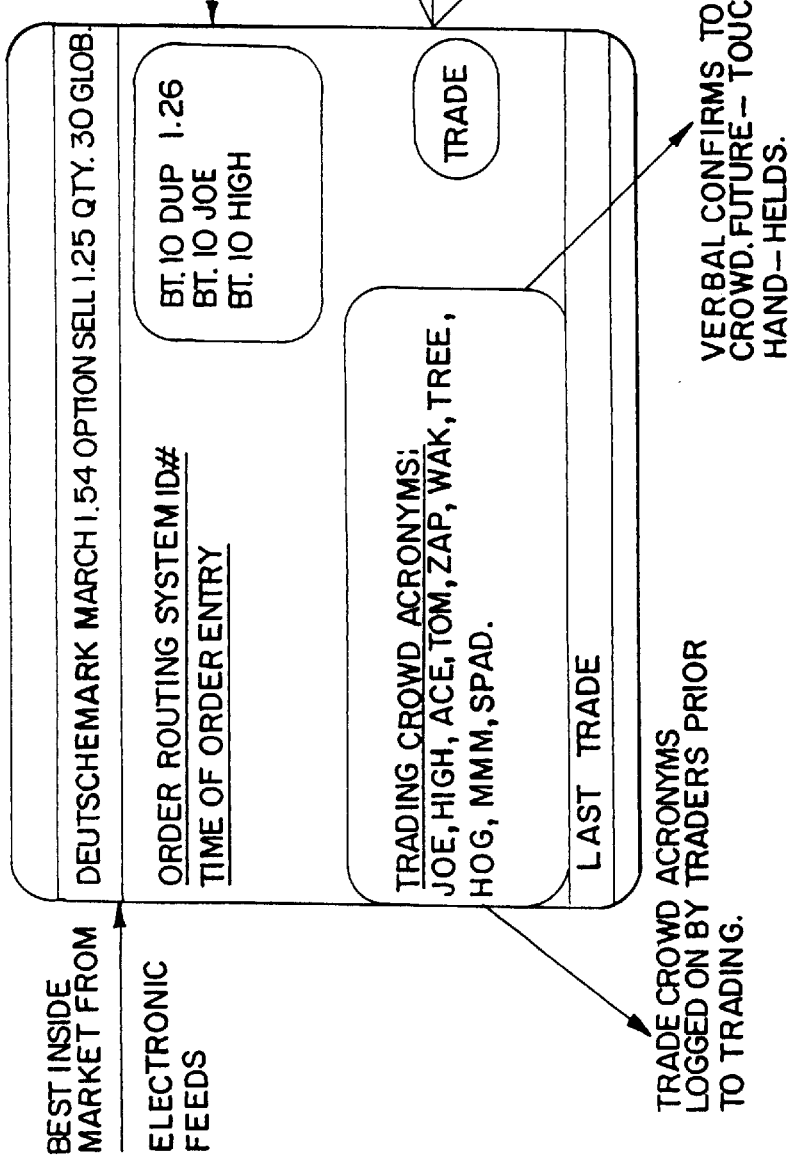
FIG. 10 is a presently preferred embodiment of an Automated Brokerage Screen for use with the PMM/Rolling Spot Link Options Workstation of the system of the present invention.

FIGS. 9 and 10 show preferred embodiments of the PMM/Rolling Spot Link Options Workstation Trading and Risk Management Screen 72 and the Automated Brokerage Screen 68, respectively. These screens 68, 72 are similar to the screens discussed above with the exception that they convey options information and are used for the PMM Options computer 35 rather than the PMM Futures computer 33.

The PMM/Rolling Spot System of the present invention provides several advantages. The system provides exchange floor traders, brokers and customers with an ongoing market for trade layoff, both profitable and otherwise. Traders, either in futures and options via a spread, or in the Rolling Spot, will be able to stop unprofitable positions based on the knowledge that a sized bid at or below, or sized offer at or above, their trade exists. This element of the PMM/Rolling Spot Link will increase trader willingness to increase trading activity—trade and take larger positions—even during market cycles when currency volatility may be high.

Increased "floor trader activity" will encourage growing volume and open interest in currency futures. It will also increase the open interest distribution in the currency products. Unlike other successful futures products, currency products do not produce significant open interest beyond the first expiration month. Many forex market transactions are now occurring at durations of less than fourteen days. A PMM/Rolling Spot Currency System will exploit this vast marketing terrain where present products do not and provide a needed public service. Since significant forex activity takes place between the current date and the first fourteen days, exchange open interest will accumulate in this area and give exchange traded currency products a wider subsequent participation and that participation will reduce transaction costs of all currency trades.

A unique feature of the PMM/Rolling Spot Currency System is the ability to have a heretofore over-the-counter unregulated trading concept, regulated within the rules of an exchange(s) and the various domestic regulatory agencies governing those exchanges, such as the Securities and Exchange Commission and the Commodities Futures Trading Commission. This is a powerful concept because regulation will add safety to the world currency markets. It is to the advantage of the world currency trading community, both cost-wise and time-wise, to utilize the existing exchange regulatory framework rather than create a new set of regulations in the over-the-counter forex market.

Also, unique to this invention, is its ability to mandate that the Principal Market Maker computer maintain business contacts throughout the trading community. This direct marketing approach by a recognizable market maker that is required to provide constant 24-hour international currency trading, is in direct contrast to the generally accepted exchange(s) practices of passive exchange generated marketing and will provide the trading community with much needed exchange contacts.

As those skilled in the art will appreciate, the system described herein should accommodate a plurality of markets such as, for example, interest rate, agricultural commodities, etc. The system should also accommodate a plurality of information vendors such as Dow-Jones Telerate. Thus, it is to be understood that the foregoing detailed description is illustrative rather than limiting and it is the following claims, including all equivalents, which are intended to define the scope of the invention.

What is claimed is:

1. A principal market maker/rolling spot system for trading currency futures, comprising:

a principal market maker futures computer operative to receive and automatically execute primary currency futures purchase and sale trades and orders and maintain a currency futures bid and offer market;

a principal market maker options computer operative to receive and automatically execute secondary currency futures purchase and sale trade and orders and maintain a currency options bid and offer market; and a bi-directional communications link coupled between the futures and options computers, the bi-directional communications link to facilitate intermarket trading to manage risk taken in a position resulting from a trade in either market.

2. The link defined in claim 1, further comprising a second communications link to rolling spot future trade systems.

3. The link defined in claim 1, further comprising a second communications link to currency futures trade systems.

4. The link defined in claim 1, further comprising a second communications link to allow vertical, horizontal and combination spread options trading.

5. The link defined in claim 1, wherein the bi-directional communications link comprises a wireless communication system.

6. The link defined in claim 1, wherein the bi-directional communications link comprises a telephone.

7. The link defined in claim 1, wherein the bi-directional communications link comprises a touch activation computer.

8. The link defined in claim 1, wherein the bi-directional communications link comprises a voice activation computer.

9. A principal market maker system for trading commodities, comprising:
- a principal market maker futures computer operative to receive and automatically execute primary commodity purchase and sale trades and orders and maintain a commodity futures bid and offer market;
- a principal market maker options computer operative to receive and automatically execute secondary commodity purchase and sale trades and orders and maintain a commodity options bid and offer market; and
- a bi-directional communications link coupled between the futures and options computers, the bi-directional communications link to facilitate intermarket trading to manage risk taken in a position resulting from a trade in either market.

10. An electronic market for trading commodities, comprising:
- a communications interface operative to transmit commodity bids and offers from at least one financial institution;
- a principal market maker computer coupled to the communications interface, the principal market maker computer operative to receive the commodity bids and offers and execute trades to maintain a market for commodity trades; and
- a principal market maker options computer.

11. The electronic market defined in claim 10, further comprising a bi-directional communications link coupled between the options computer and principal market maker computer.

12. The electronic market defined in claim 10, wherein the link comprises a modem.

13. The electronic market defined in claim 10, wherein the link comprises a telephone.

14. The electronic market defined in claim 10, wherein the link comprises a voice activation computer.

15. The electronic market defined in claim 10, wherein the link comprises a touch screen display.

16. The electronic market defined in claim 10, wherein the link comprises a keyboard.

17. A computerized method having a principal market maker computer for maintaining a market for publicly traded currency futures, comprising the steps of:
- receiving primary currency futures purchase and sale trades and orders, the primary currency futures purchase and sale trade and order indicative of whether a currency future is to be bought or sold;
- receiving secondary currency futures purchase and sale trades and orders, the secondary currency futures purchase and sale trades and orders, indicative of a currency futures options hedge;
- automatically matching and executing primary currency futures purchase and sale trades and orders to maintain a currency futures market;
- automatically matching and executing secondary currency futures purchase and sale trades and orders to maintain a currency futures options market; and
- providing a communications link to allow intermarket futures and options trading to manage risk taken in a position resulting from a trade in either market.

18. The method of claim 17 wherein the communications link is coupled to a rolling spot future trade system.

19. The method of claim 17 wherein the communications link is coupled to a currency futures trade system.

20. The method of claim 17 wherein the communications link allows vertical, horizontal and combination spread options trading.

21. A computerized method having a principal market maker computer for maintaining a market for publicly traded currency futures, comprising the steps of:
- receiving primary currency futures purchase and sale trades and orders, the primary currency futures purchase and sale trade and order indicative of whether a currency future is to be bought and sold;
- receiving secondary currency futures purchase and sale trades and orders, the secondary currency futures purchase and sale and order indicative of an outright option purchase and sale;
- automatically matching and executing the primary currency futures purchase and sale trade and order to maintain a currency futures market;
- automatically matching and executing the secondary currency futures purchase and sale trade and order to maintain a currency futures options market; and
- providing intermarket futures and options trading to manage risk taken in a position resulting from a trade in either market.

22. The method of claim 21 further comprising the step of providing a communications link to rolling spot future trade systems.

23. The method of claim 21 further comprising the step of providing a communications link to currency futures trade systems.

24. The method of claim 21 further comprising the step of providing a communications link to allow vertical, horizontal and combination spread options trading.

25. A computerized method having a principal market maker computer for maintaining a market for publicly trade currency futures, comprising the steps of;
- receiving primary currency futures purchase and sale trades and orders, the primary currency futures purchase and sale trade and order indicative of whether a currency future is to be bought or sold;
- receiving secondary currency futures purchase and sale trade and orders, the secondary currency futures purchase and sale trade and order indicative of an outright option purchase and sale;
- automatically matching and executing primary currency futures purchase and sale trades and orders to maintain a currency futures market;
- automatically matching and executing secondary currency futures purchase and sale trades and orders to maintain a currency futures market; and
- providing intermarket futures and options trading to manage risk taken in a position resulting from a trade in either market.

26. The method of claim 25 further comprising the step of providing a communications link to rolling spot future trade systems.

27. The method of claim 25 further comprising the step of providing a communications link to currency futures trade systems.

28. The method of claim 25 further comprising the step of providing a communications link to allow vertical, horizontal and combination spread options trading.

* * * * *

UNITED STATES PATENT AND TRADEMARK OFFICE
CERTIFICATE OF CORRECTION

PATENT NO. : 5,963,923
DATED : October 5, 1999
INVENTOR(S) : Howard B. Garber

It is certified that error appears in the above-identified patent and that said Letters Patent is hereby corrected as shown below:

In claim 25, line 2, delete "trade" and substitute --traded-- in its place.

Signed and Sealed this

Twenty-second Day of May, 2001

Attest:

NICHOLAS P. GODICI

*Attesting Officer*      *Acting Director of the United States Patent and Trademark Office*

UNITED STATES PATENT AND TRADEMARK OFFICE
CERTIFICATE OF CORRECTION

| | |
|---|---|
| PATENT NO. | : 5,963,923 |
| APPLICATION NO. | : 08/868200 |
| DATED | : October 5, 1999 |
| INVENTOR(S) | : Garber |

It is certified that error appears in the above-identified patent and that said Letters Patent is hereby corrected as shown below:

Col. 11,
In claim 12, line 1, replace the numeral "10" with --11--.
In claim 13, line 1, replace the numeral "10" with --11--.
In claim 14, line 1, replace the numeral "10" with --11--.
In claim 15, line 1, replace the numeral "10" with --11--.
In claim 16, line 1, replace the numeral "10" with --11--.

Signed and Sealed this

Thirty-first Day of July, 2007

JON W. DUDAS
*Director of the United States Patent and Trademark Office*

(12) EX PARTE REEXAMINATION CERTIFICATE (10530th)
United States Patent
Garber

(10) Number: US 5,963,923 C1
(45) Certificate Issued: Mar. 11, 2015

(54) SYSTEM AND METHOD FOR TRADING HAVING A PRINCIPAL MARKET MAKER

(75) Inventor: Howard B. Garber, Chicago, IL (US)

(73) Assignee: Technology Research Group LLC, Washington, DC (US)

Reexamination Request:
No. 90/011,479, Feb. 7, 2011

Reexamination Certificate for:
Patent No.: 5,963,923
Issued: Oct. 5, 1999
Appl. No.: 08/868,200
Filed: Jun. 3, 1997

Certificate of Correction issued May 22, 2001

Related U.S. Application Data

(60) Provisional application No. 60/030,584, filed on Nov. 12, 1996.

(51) Int. Cl.
*G06Q 40/04* (2012.01)
*G06Q 40/00* (2012.01)

(52) U.S. Cl.
CPC ............... *G06Q 40/04* (2013.01); *G06Q 40/00* (2013.01)
USPC ............... 705/37; 235/379; 235/380; 705/35

(58) Field of Classification Search
USPC ........................................................ 705/37
See application file for complete search history.

(56) References Cited

To view the complete listing of prior art documents cited during the proceeding for Reexamination Control Number 90/011,479, please refer to the USPTO's public Patent Application Information Retrieval (PAIR) system under the Display References tab.

*Primary Examiner* — Sam Rimell

(57) ABSTRACT

A system and method is provided for linking a Rolling Spot Currency contract with a Principle Market Maker program. In one aspect of the invention, the system includes an electronic brokerage and trading network having at least one computer coupled to receive and transmit bids and offers for international currency trading; a display terminal and input; and a principal market maker computer coupled to the electronic brokerage and trading network wherein the principal market maker computer is operative to receive and transmit the bids and offers and execute international currency trades by maintaining a market for such currencies. In another aspect of the invention, the method includes the steps of receiving and transmitting bids and offers for publicly traded currencies; storing the received bids and offers in a memory; identifying and executing the matching bids and offers; and identifying unmatched bids and offers and providing a complementary trade to maintain a market for such currencies.

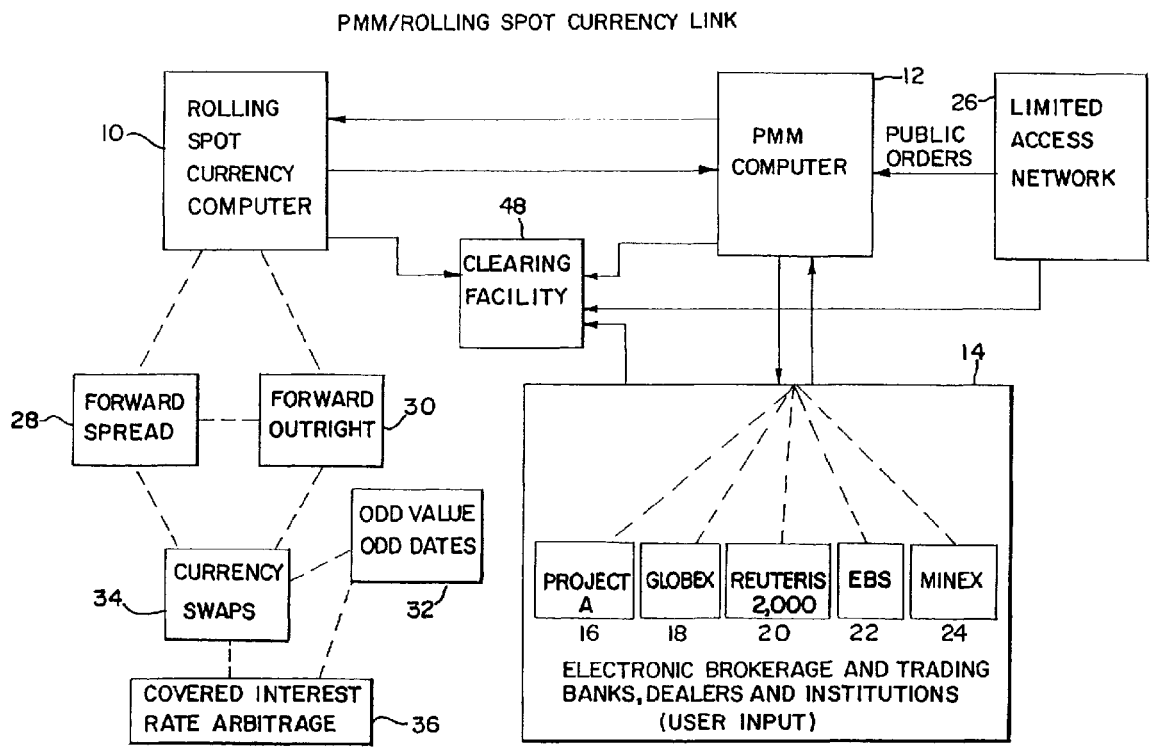

PMM/ROLLING SPOT CURRENCY LINK

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-28 are cancelled.

\* \* \* \* \*